United States Patent [19]

Cowen

[11] 4,399,564
[45] Aug. 16, 1983

[54] FIBER OPTIC SYSTEM FOR TRANSMISSION OF VIDEO SIGNALS BY PULSE-FREQUENCY-MODULATION

[75] Inventor: Steven J. Cowen, San Diego, Calif.

[73] Assignee: The United States of America as represented by the Secretary of the Navy, Washington, D.C.

[21] Appl. No.: 122,335

[22] Filed: Feb. 19, 1980

[51] Int. Cl.³ .............................................. H04B 9/00
[52] U.S. Cl. ..................................... 455/608; 455/617; 455/611
[58] Field of Search ............... 455/608, 617, 619, 618, 455/611, 43; 250/237; 370/1, 3

[56] References Cited

U.S. PATENT DOCUMENTS

| | | | |
|---|---|---|---|
| 3,258,596 | 6/1966 | Green | 455/611 |
| 3,488,586 | 1/1970 | Walrous et al. | 455/608 |
| 3,876,939 | 4/1975 | Lerner | 455/43 |
| 3,899,429 | 8/1975 | Ueno et al. | 455/611 |
| 4,019,048 | 4/1977 | Maiome et al. | 455/619 |

FOREIGN PATENT DOCUMENTS 54-135550 10/1979 Japan .................... 455/619

OTHER PUBLICATIONS

E. Yoneda et al., *Optical Fiber Versatile Transmission Systems for Field Trial*, Nov.-Dec. 1979, pp. 936-948, Review of the Electrical Communication Laboratories, vol. 27, No. 11-12.

Y. Ueno et al., *An Optical Fiber Cable Communication System Using Pulse Interval Modulation*, European Conference on Fibre Optical Communication, Sep. 16-18, 1975, pp. 156-158.

*Primary Examiner*—Robert L. Griffin
*Assistant Examiner*—Edward L. Coles
*Attorney, Agent, or Firm*—Robert F. Beers; Ervin F. Johnston; Terrance A. Meador

[57] ABSTRACT

A fiber optic system utilizing pulse-frequency modulation (PFM) for transmission of video information signals substantially enhances the signal-to-noise ratio of the transmitted video signals. FM processing gain is realized together with system noise reduction which results from operation of the fiber optic components in a pulsed mode. The amplitude of a video signal modulates the repetition frequency of a stream of narrow light pulses emitted by a laser diode. The pulses are transmitted through a low loss, wideband optical fiber to an avalanche photodiode biased at an optimum gain point. Further improvement is possible when preemphasis processing of the video signal is performed prior to transmission.

15 Claims, 5 Drawing Figures

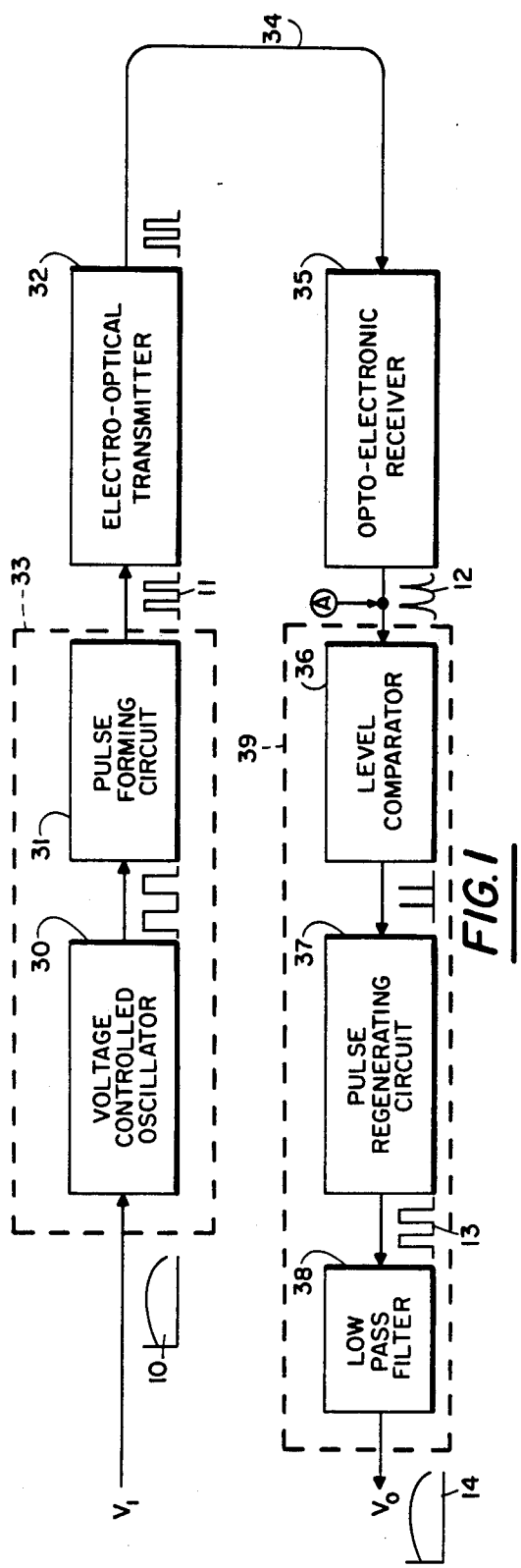
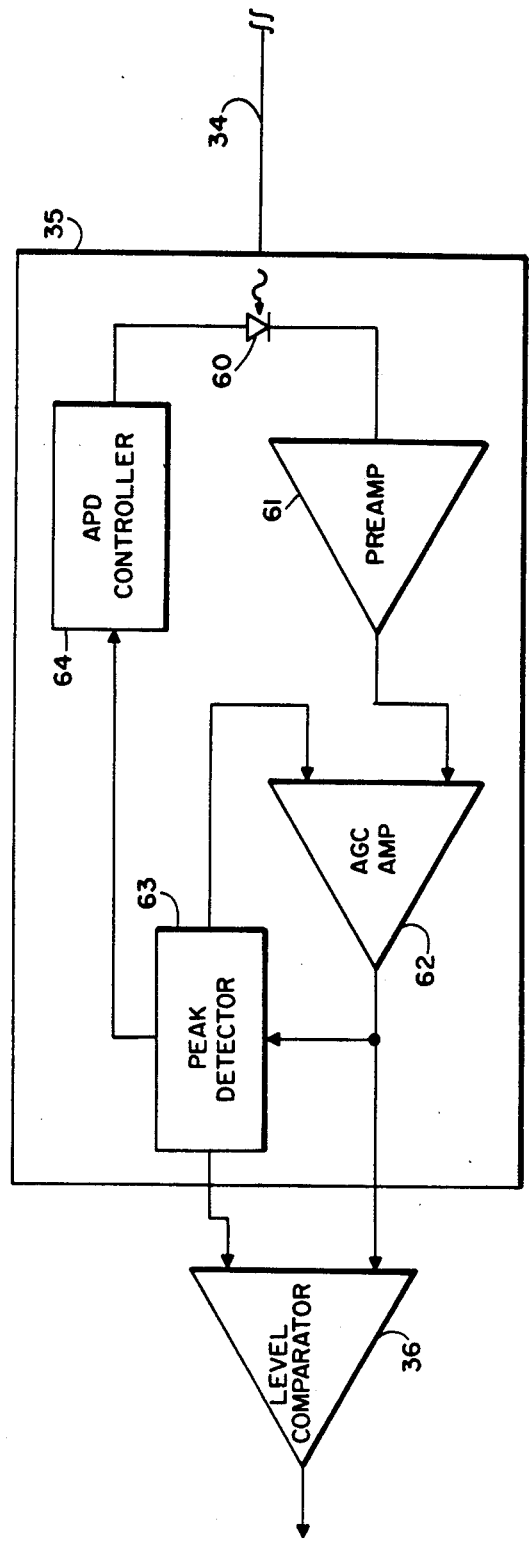
FIG.1
FIG.5

FIBER OPTIC SYSTEM FOR TRANSMISSION OF VIDEO SIGNALS BY PULSE-FREQUENCY-MODULATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains to the field of communications engineering. More particularly, the invention pertains to the fields of transmission system design and modulation theory. In still greater particularity, this invention pertains to systems in which pulsed signals are transmitted through a fiber optic transmission apparatus. The field of the invention includes the field of modulating the repetition frequency of pulses of the above type with the amplitude of a video signal.

Video signals comprise the set of communication signals whose power spectra reveal a wide frequency range containing no DC component. Most of the video signal power is concentrated in the lower frequencies; however, significant information value is contained in the higher frequencies. Television signals and audio signals, for example, fall into this field.

A need exists for long-distance, non-broadcast transmission of video information. For example, distribution of closed-circuit television signals, area surveillance, observation of deep-sea phenomena, and control of industrial production lines are all applications requiring inexpensive, reliable transmission of video signals over long distances. The indicium of quality applying to a long-distance video transmission system is the signal-to-noise ratio (SNR) of the transmitted signal. A high SNR results in realization of lengthened transmission distance.

Long distance transmission of video signals through conduction cables has been limited in the past by the characteristic gain-bandwidth products of typical metallic conductors. Utilization of a high quality, wideband, low loss optical fiber transmission channel has been shown to significantly increase the distance over which a video signal can be transmitted. With high power, high speed injection laser diodes, and high gain avalanche photodetectors included in fiber optic system design, transmission distance can be further extended.

In a fiber optic transmission system, transmission by intensity modulation (IM), where the amplitude of the transmitted video signal is represented by the intensity of the conducted optical signal, is inefficient and minimally effective. The narrowband IM signal wastes available transmission bandwidth. The modulation index is minimized by the limited linearity of available optical sources; the continuous IM signal increases photodetector shot noise; both factors reduce realizable SNR. As a consequence of the limited effectiveness of IM, frequency modulation (FM) has received a great deal of attention as a modulation technique particularly suited to fiber optic transmission.

Frequency modulation, wherein a change in amplitude of a modulating signal is represented as a change in frequency of a carrier signal, has been used in fiber optic transmission to take greater advantage of available transmission bandwidth and to enhance the SNR of the transmitted signal through the well-known processing gain associated with FM. Because FM is a nonlinear technique, its application is not limited by nonlinearities associated with optical transmitters. There are two principal disadvantages in applying FM to fiber optic transmission which limit the realizable SNR. Classical FM techniques, which are based upon modulation of a continuous signal with a 50 percent duty factor, result in a significant level of average transmitted power which can result in the stimulation of shot noise in the photodetector. The 50 percent duty factor of the FM carrier also reduces the peak power amplitude obtainable from optical power sources whose lifetimes are directly related to average power dissipation.

Transmission techniques based upon the modulation of widely spaced, narrow pulses are known to benefit the SNR performance of fiber optic transmission systems. The low duty cycle of pulse modulation (PM) allows an optical transmitter to provide high output power peaks at no cost in life expectancy. In addition, output power peaks can be averaged over the low duty cycle to reduce average signal power incident on the photodetector which results in a diminution of background shot noise.

A technique of PM is exemplified in U.S. Pat. No. 3,899,429, 1975, issued to Y. Ueno, et al., which discloses the use of a pulse-position modulation (PPM) technique in which the time positions of transmitted pulses relative to each other are modulated by a signal which is the algebraic summation of an information signal and a ramp signal. Such a technique takes advantage of the superior operation of fiber optic transmission systems under pulsed conditions; however, it is known that the signal-to-noise performance of PPM does not match that of FM. (Carlson, A. B., *Communication Systems: An Introduction to Signals and Noise in Electrical Communication*, McGraw-Hill, Inc., 1968, pp. 299–302).

It has been suggested in the literature that a pulse-frequency modulation (PFM) approach might combine the desirable aspects of FM and PM when employed in a fiber optic transmission system. (Timmermann, C. C., "Signal-to-Noise Ratio of a Video Signal Transmitted by a Fiber-Optic System Using Pulse-Frequency Modulation," *IEEE Transactions on Broadcasting*, Vol. BC-23, No. 1, March 1977, pp. 12–17). However, the article lacks the analysis and synthesis of a PFM fiber optic video transmission system which would enable one skilled in the art to design and fabricate one. A design method for such a system is described in a recent publication. (Cowen, S. J., *Proceedings IEEE Oceans 1979 Conference*, "Fiber Optic Video Transmission System Employing Pulse Frequency Modulation," CH 1478-7/79/0000-0253, September 1979 pp. 253–259).

Pulse-frequency modulation is a method in which the amplitude of a modulating signal is represented by the repetition frequency of a stream of transmitted pulses having constant widths. As such, the spectrum of PFM is composed of a series of harmonically-related, phase-locked FM spectra having theoretically infinite bandwidths. (Panter, P. F., *Modulation, Noise, and Spectral Analysis*, McGraw-Hill, N.Y. 1965, pp. 506, 536). The envelope of the amplitude spectrum of the unmodulated PFM carrier displays the familiar sin (X)/X form, having a zero order component with a sideband. This suggests the use of low-pass filtering to recover the envelope of a modulating signal.

The prior art reveals no concept for a fiber optic video transmission system employing pulse frequency modulation which provides a simple, efficient system design intended to maximize SNR of the transmitted signal by fully utilizing the gain-bandwidth product of an optical fiber.

SUMMARY OF THE INVENTION

The apparatus according to the invention optically transmits video information signals by modulating the repetition frequency of a stream of narrow, relatively widely separated optical pulses of constant width by the amplitude of the video signals. By combining such a modulation technique with a fiber optic transmission system, a video transmission system is capable of imparting a significant FM processing gain to the transmitted video signal as well as utilizing the fiber optics system in its least noisy mode of operation, to enhance the signal-to-noise ratio of the transmitted signals.

The subject invention is usefully embodied in an apparatus comprising a waveform generator for producing a stream of narrow, relatively widely spaced electrical pulses of constant width, wherein the repetition frequency of the pulses is proportional to the amplitude of a modulating video signal. The generator comprises a periodic waveform source which generates a periodic waveform whose repetition frequency varies according to the amplitude of the video signal, and a pulse former which produces a constant-width electrical pulse at the same point in each cycle of the periodic wave. The electrical pulses are applied to an electro-optical transmitter which converts them into optical pulses. The optical pulses are transmitted through a fiber optic cable which conducts the optical pulses to an opto-electronic receiver. The opto-electronic receiver is connected to the fiber optic cable for receiving the optical pulses and converting them into pulses of electrical voltage. The voltage pulses are applied to a discriminating means comprising a level comparator for comparing the level of the voltage pulses with a predetermined electrical level, a pulse regenerator coupled to the comparator for producing a pulse of predetermined characteristics whenever triggered by the comparator, and a low-pass filter connected to the regenerator for rejecting the high frequency components of the equalized pulses and recovering the envelope of the transmitted waveform.

Waveform generating circuitry according to the invention comprises a voltage-controlled oscillator which generates a square wave whose frequency is modulated by the input video signals. Auxiliary circuitry is provided to narrow the width of the frequency modulated square wave by triggering on each positive going edge of the square wave.

Transmission circuitry according to the invention comprises conventional electro-optical emitting means which is responsive to the electrical pulses delivered by the pulse narrowing circuitry for generating optical pulses in response thereto.

The fiber optic conductor comprises a jacketed single optical fiber enclosed in a protective cable.

Opto-electronic receiving circuitry according to the invention comprises photodetecting means connected to the fiber optic cable which generates pulses of electric current in response to the transmitted optical pulses. A preamplifier is connected to the photodetector for amplifying and converting the current pulses into detected electrical pulses.

The opto-electronic receiver according to the invention further comprises automatic gain control circuitry connected between the output of the preamplifier and the level comparator for maintaining uniform receiver operation under conditions of varying optical signal intensity.

In a modification of the above apparatus, preemphasis means are connected to the input of the voltage-controlled oscillator for modifying the spectrum of the input video signals by providing relatively more gain for the high frequencies of the spectrum than for the low frequencies. At the receiver, the de-emphasis means are connected to the output of the low-pass filter for modifying the spectrum of the output signals by providing gain to the output signals which is a complement of gain provided by the preemphasis means to the input signals. Such a modification may usefully be employed to further improve the signal-to-noise ratio of a video signal transmitted through the fiber optic system of the invention.

OBJECTS OF THE INVENTION

An object of the invention is to provide a new and improved system for optically transmitting video information signals by modulating the repetition frequency of a stream of narrow, relatively widely separated optical pulses of constant width by the amplitude of the video signals.

Another object is to provide a fiber optic video transmission system employing pulse-frequency modulation in which expansion of the bandwidth of the transmitted video signal through the fiber optic system provides FM processing gain, thereby increasing the signal-to-noise ratio of the transmitted video signal.

A still further object of the invention is to provide a fiber optic transmission system employing frequency modulation in which the conducted optical signal consists of narrow, constant width, low duty factor pulses, thereby minimizing system noise.

Yet another object of the invention is to provide a fiber optic video transmission system in which FM processing gain is realized together with a low noise mode of fiber optic system operation.

These and other objects of the invention will become more readily apparent from the ensuing specification when taken together with the drawings.

BRIEF DESCRIPTION OF THE DRAWINGS

FIG. 1 shows a block diagram of an embodiment of the invention.

FIG. 5 shows a block diagram of the opto-electronic receiver of the invention.

DESCRIPTION OF THE PREFERRED EMBODIMENT

Figure 4:
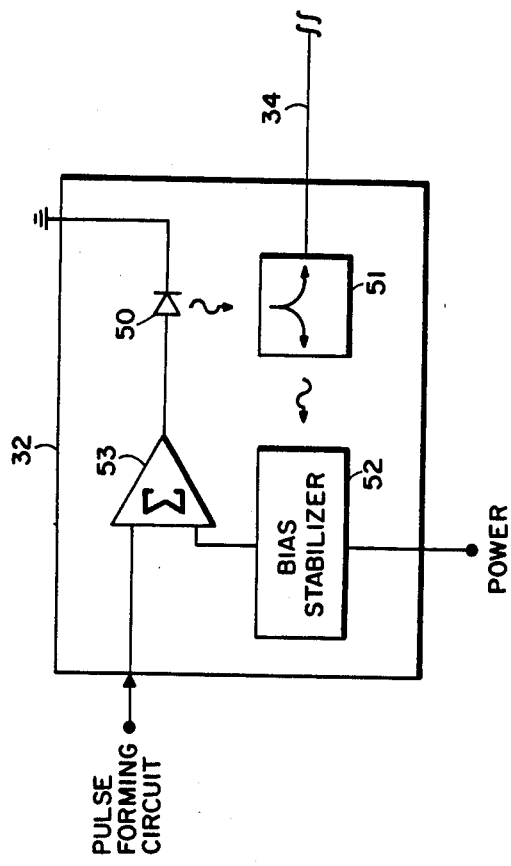
FIG. 4 shows a block diagram of the electro-optical transmitter of the invention.

Referring to FIG. 1, there is shown an input video voltage, $v_1$, introduced at the input of waveform generator 33 comprising voltage-controlled oscillator (VCO) 30 and pulse-forming circuit 31. VCO 30 responds to $v_1$ by producing a square wave having a 50 percent duty factor whose frequency varies with the amplitude of $v_1$. Pulse-forming circuit 31, connected to the output of VCO 30, is triggered by the positive-going edges of the frequency-modulated square wave and produces a narrowed constant-width electrical pulse in response thereto for each cycle of the square wave. The narrowed electrical pulses are connected to the input of electro-optical transmitter 32 which produces an optical pulse in response to each electrical pulse. The optical pulses output by electro-optical transmitter 32 are coupled into fiber optic cable 34 wherein they are conducted to opto-electronic receiver 35. Thereafter, the optical pulses are converted into electrical pulses by opto-electronic receiver 35. The electrical pulses are fed to discriminator 39 comprising level comparator 36, pulse regenerating circuit 37, and low-pass filter 38. Level comparator 36 is triggered to produce a narrow spike of voltage whenever the amplitude of an electrical pulse exceeds a predetermined comparison threshold. Pulse regenerating circuit 37 produces a pulse of constant width upon sensing a spike at the output of level comparator 36. Low pass filter 38, connected to the output of pulse regenerating circuit 39, rejects the high frequency components of input pulses and produces an output analog voltage, $v_0$, composed of the low frequency components of the input pulses. Analog voltage $v_0$ is a reproduction of input video voltage $v_1$.

Figure 2:
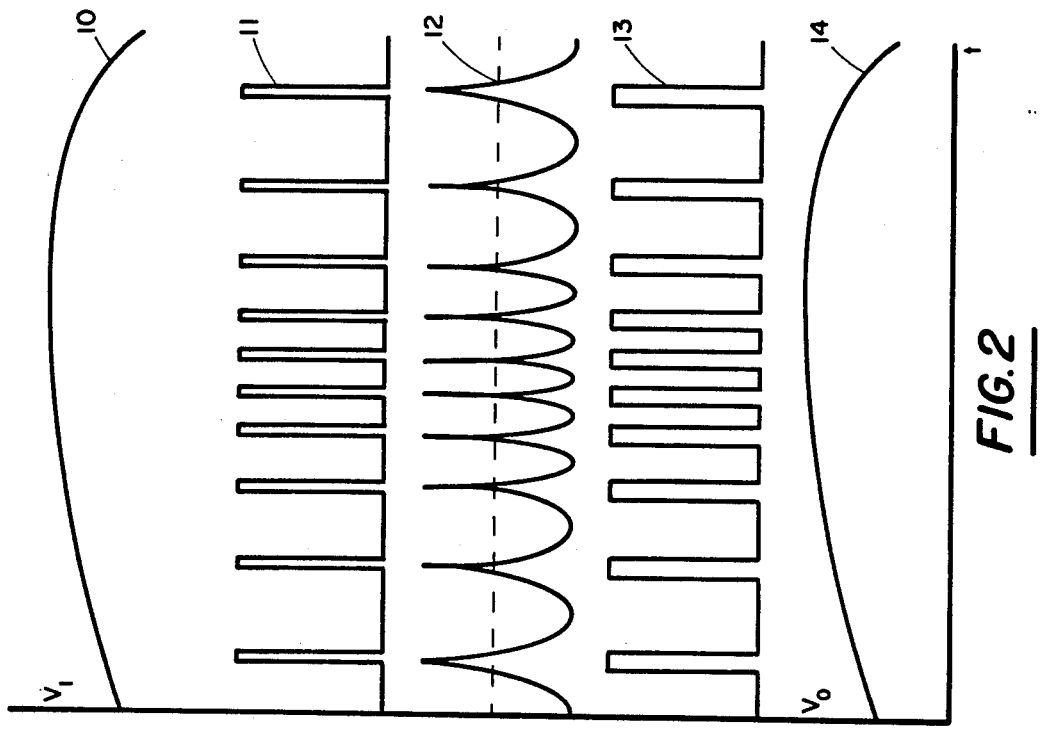
FIG. 2 shows plots of waveforms which are useful for understanding the operation of FIG. 1.

The operation of the system illustrated in FIG. 1 can be understood with reference to FIG. 2. Waveform 10 represents the input video signal, $v_1$, which is applied to the input of VCO 30. Pulse-forming circuit 31 responds to the positive-going zero crossings of the frequency-modulated waveform produced by VCO 30 to yield the train of narrow, constant width pulses, represented by waveform 11, whose frequency varies as a function of the instantaneous amplitude of waveform 10. This pulse train is subsequently transmitted over fiber optic cable 34 by means of electro-optical transmitter 32 in the form of a stream of optical pulses. The optical pulses transit fiber optic cable 34 whose transmission properties cause the pulses to be reduced in amplitude and spread in time. Upon reaching the end of fiber optic cable 34, the optical pulses are converted into an electric voltage by opto-electronic receiver 35. By virtue of the photodetection and amplification processes of opto-electronic receiver 35, the pulses are additionally broadened due to the finite bandwidth of the receiver, and are corrupted by noise. The broadened, noise-corrupted pulses, represented by waveform 12, have imposed on them the comparison threshold of level comparator 36, represented by the dashed line in waveform 12. The received, detected pulses are then reconstituted in pulse regenerating circuit 37 where effects of dispersion and noise add a degree of jitter to the reconstituted pulses; the reconstituted pulses, represented by waveform 13, have a constant width, greater than that of the transmitted pulses. Low-pass filter 38, designed with a video bandwidth, converts the reconstituted pulses into a video output signal, represented by waveform 14, by rejecting the RF component of the pulses.

In the reference cited hereinabove it was noted that, if system operational parameters are correctly chosen, the effect of jitter upon the quality of a transmitted video signal is insignificant; jitter effects are minimized by setting carrier-to-noise ratio ($\sqrt{C/N}$), defined with respect to peak pulse current and RMS noise current and measured at point A in FIG. 1, well above threshold ($\sqrt{C/N} \gg 1$).

Threshold $\sqrt{C/N}$ for the preferred embodiment is set at level discriminator 36 and is referenced to $KV_s$, where $V_s$ is peak pulse height at the output of receiver 5 and $0 < K < 1$. To prevent noise peaks crossing this level and introducing ambiguity in the edges of pulses output by regenerator 37, a gaussian noise of RMS voltage $\sigma$ is assumed. The magnitude of objectionable noise peaks can be set, for example, at $3\sigma$. Thus, $$KV_s = 3\sigma \quad (1)$$

$$\frac{V_s}{\sigma} = \sqrt{C/N}\Big|_{threshold} = 20 \log (3/K) \quad (2)$$

For $K=0.5$, $\sqrt{C/N} = 15.6$ dB
For $K=0.7$, $\sqrt{C/N} = 12.7$ dB

The threshold set at level comparator 36, together with the sensitivity of opto-electronic receiver 35, establish the maximum signal loss (and the maximum length) allowable for fiber optic cable 34. It is obvious that the pulsed mode of operation of the preferred embodiment, when compared with other modes, provides increased system loss tolerance by maximizing the peak amplitude of the transmitted optical pulse and reducing the contribution of shot noise to the system noise level.

Figure 3:
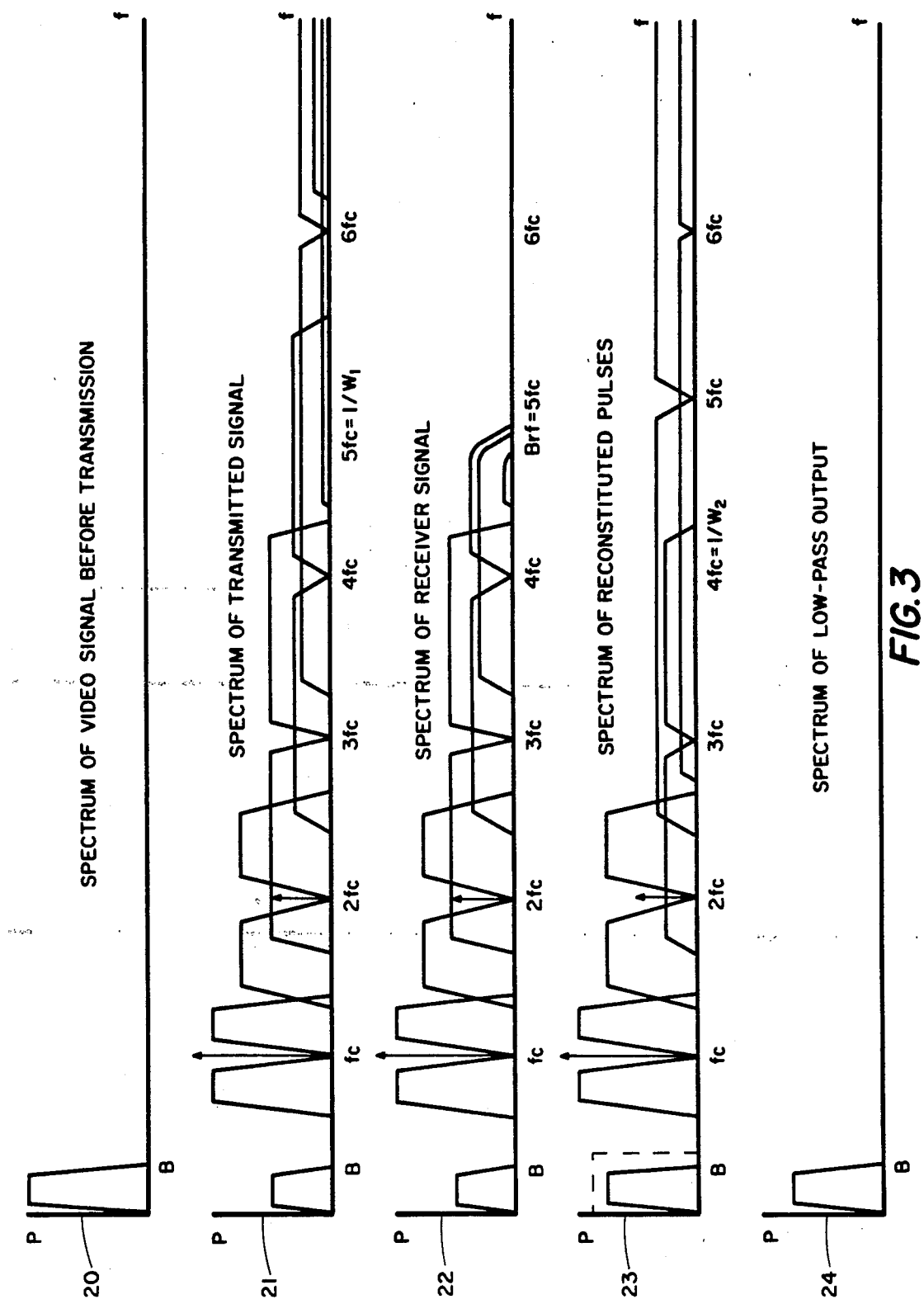
FIG. 3 shows plots of signal spectra which are also useful for understanding the theory of operation of FIG. 1.

The theory of operation of the system illustrated in FIG. 1 can be understood with reference to FIG. 3. The power spectrum of a representative video signal with bandwidth B can be contained in a spectral distribution represented by spectral plot 20. Note that this signal occupies only a small fraction of the bandwidth potentially available with a fiber optic transmission system. For example, high resolution television occupies approximately a 5 MHz bandwidth, while a quality, graded index optical fiber might have a length-bandwidth product on the order of 1 GHz-kilometer, yielding a useable bandwidth of 100 MHz over a 10 kilometer length. If the data signal is transmitted directly, as in the case of presently available fiber optic systems using intensity modulation, the channel is used inefficiently and performance suffers accordingly. This is because the information has not been well matched to the available channel capacity by the modulation process.

The power spectrum of a representative PFM optical transmitter is illustrated in spectral plot 21, where $f_c$ represents the unmodulated frequency of the transmitted pulses. Note that the bandwidth of the video signal can be greatly expanded by the FM process. The power spectrum of a representative PFM transmitter can extend to a very high frequency, limited only by the frequency response of the selected optical power source. For example, representative injection laser diodes exhibit frequency responses approaching 1 GHz. In a fiber optic PFM system, however, most of the spectral energy will be contained within the bandwidth $1/W_1$, where $W_1$ is the width of each pulse. For example, if the pulse width is 10 nanoseconds, most of the signal energy is concentrated in the band below 100 MHz. In spectral plot 21, $1/W_1$ is arbitrarily chosen to equal $5f_c$.

The signal represented by spectral plot 21 is transmitted through a fiber optic cable to a receiver where the signal is detected and limited to a bandwidth, $B_{rf}$, related to pulse width, $W_1$, by equation (5). To minimize receiver noise, this bandwidth should be less than the combined bandwidth of the optical transmitter and the optical transmission channel. Thus, the combination of transmitter, fiber channel, and receiver bandwidths is $B_{rf}$.

It is well known that:

$$W_1 = \sqrt{2}\, t_r \quad (t_r = \text{pulse rise time}) \quad (3)$$

$$t_r = 0.35/B_{rf} \quad (4)$$

$$W_1 = 0.5/B_{rf} \quad (5)$$

Spectral plot 22 represents the effect of receiver bandwidth limitation upon the transmitted signal. Power spectrum 22 is presented to a discriminator comprising, in the preferred embodiment, a level comparator, a pulse regenerating circuit, and a low-pass filter. The discriminator reconstructs the pulse train such that it resembles the transmitted pulses plus the effects of noise and pulse dispersion introduced by transmission and detection. The result of pulse reconstruction is to produce a pulse with a width, $W_2$, which is larger than that of the transmitted pulse, as shown in pulse spectrum 23, where $1/W_2$ is arbitrarily chosen to equal $4f_c$. This tends to crowd the spectral energy toward the lower frequencies. The output of the discriminator is then low-pass filtered back to bandwidth B as in spectral plot 24. The result is a replica of the input video signal which has been degraded only slightly by noise due to jitter. In essence, the signal within the wide spectrum combines in a constructive manner when demodulated, while the noise decorrelates.

The reference cited hereinabove shows that the gain (G) in post-detection signal-to-noise ratio (S/N), defined with respect to peak-to-peak signal voltage and RMS noise voltage of $v_0$ in FIG. 1, associated with PFM is given by equation (6).

$$\sqrt{S/N} = G\sqrt{C/N} \quad (6)$$

$$G = \frac{1.15\, \Delta F(1 + \Delta F^2/f_c^2)B_{rf}}{f_c^{\frac{1}{2}} B^{3/2}}$$

Where:
$\Delta F$ = FM deviation,
$f_c$ = PFM unmodulated carrier frequency,

It is obvious that $\Delta F$ is related to $f_c$ and to B by design techniques well known in the art of communications engineering.

With reference to FIG. 4, the operation of the electro-optical transmitter 32 of the preferred embodiment can be understood.

The output of pulse forming circuit 31 is fed to summation network 53 where the electrical pulse train is combined with the output of bias stabilizer 52. Injection laser diode 50 is fed by the output of summation network 53 and emits optical pulses in response thereto into optical coupler 51 which directs the optical pulses into fiber optic cable 34. A portion of the optical energy emitted by laser diode 50 is directed by coupler 51 to stabilizer 52.

Summation network 53, which can comprise a resistor network, provides a constant bias to maintain laser diode 50 near its lasing threshold. Bias stabilizer 52 adjusts the current level through laser diode 50 to maintain constant the amplitude and risetime of output optical pulses against changes in transfer characteristics of laser diode 50. Stabilizer 52 and coupler 51 can be constructed according to design techniques well known in the art.

The circuit structure of FIG. 4 ensures that laser diode 50 is required only to generate narrow, constant width, low duty factor pulses. Lasers operate at their best in this mode, providing high optical power and enhanced life expectancy.

FIG. 5 illustrates the design of opto-electronic receiver 35 of the preferred embodiment. Avalanche photodetector 60, connected to fiber optic cable 34 converts optical pulses to electric current pulses by the well-known avalanche detection process. Preamplifier 61 amplifies the current pulses and converts them into voltage pulses. Preamplifier 61 is connected to an input of automatic-gain-control (AGC) amplifier 62. AGC amplifier 62 is connected to the input of peak detector 63 and to one input of level comparator 36. Peak detector 63 has three outputs: one connected to an input of level comparator 36, one to an input of AGC amplifier 62, and the third to the input of avalanche photodetector controller 64. The loop comprising AGC amplifier 62 and peak detector 63 forms an AGC loop which operates according to well known principles. The loop comprising AGC amplifier 62, peak detector 63, and avalanche photodetector controller 64 controls the avalanche threshold of avalanche photodetector 60. These two control loops ensure that the electrical pulse amplitude provided to level comparator 36 is maintained at a relatively constant level independent of input optical power levels, and that the avalanche photodetector gain is maintained at near optimum for a wide range of input optical power levels.

The output from peak detector 63 connected to level comparator 36 closes a third control loop which establishes a threshold comparison level as a function of the magnitude of pulse peak amplitude and of RMS noise voltage present at the output of AGC amplifier 62. Thus, using equation (1) for the preferred embodiment, the threshold comparison level is set at $\frac{1}{2} V_s + 3\sigma$ for triggering comparator 36 at the midpoint of pulse height.

Should $\sqrt{C/N}$ decline for any reason, peak detector 63 can be designed to automatically increase the comparison level by increasing K in equation (1).

The circuit structure illustrated in FIG. 5 allows avalanche photodetector 60 to be operated at optimum avalanche gain by avalanche photodetector controller 64 according to well known techniques. The photodetector is kept in the dark between pulses, thus minimizing background shot noise which can degrade receiver performance.

Referring once more to FIG. 1, it can be seen that a significant modification to the preferred embodiment will result with the addition of a preemphasis network, not shown, between the source of $v_1$ and the input to VCO 30, and the addition of a de-emphasis network, not shown, at the output of low-pass filter 38. Because PFM is a type of frequency modulation, frequency domain preemphasis and de-emphasis can be employed to enhance the FM processing gain. Moreover, video signals are readily amenable to preemphasis, exhibiting a power spectrum in which the bulk of the signal energy is crowded into the lower frequencies, whereas much information is carried by the higher frequencies. A gain can be realized from pre-emphasis processing in which the higher frequency components of video signals are significantly boosted without causing the average power of the preemphasized signal to greatly exceed that of the original. In the modified system, it is the preemphasized signal which modulates the transmitted pulse stream. At the opto-electronic receiver 35, the input noise due to the detection process is mapped into the characteristic parabolic spectral shape associated with FM discriminators wherein the bulk of the noise energy resides at the high frequencies.

The de-emphasis filter placed at the output of lowpass filter 38 contains a complementary shape to the preemphasis filter which restores the signal spectrum to its original shape. The de-emphasis network, by attenuating high frequencies, greatly reduces the magnitude of the noise which has been concentrated by the action of the discriminator into the portion of the bandwidth rejected by the de-emphasis filter. This results in processing gain which is additive with the spread spectrum gain associated with the PFM technique which is expressed in equation (6).

It is obvious that the hardware required to construct the preferred embodiment is simple to implement and is inexpensive, making a PFM fiber optic video transmission system extremely attractive where costs, reliability, and power consumption are important. In addition, the preferred embodiment can be optimized for any video transmission application to take full advantage of any optical fiber's attenuation and bandwidth characteristic. This optimization can be realized by proper choice of the parameters ($B_{rf}$, $W_1$, $W_2$, and $KV_s$) of the fiber optic transmission system to simultaneously reach attenuation and bandwidth limits imposed by the optical fiber. In this fashion the preferred embodiment takes full advantage of the available gain-bandwidth product of existing fibers, or those likely to be produced in the future.

The foregoing description taken together with the appended claims constitutes a disclosure such as to enable a person skilled in the electronics and communications engineering arts and having the benefit of the teachings contained therein to make and use the invention. Further, the apparatus herein described meets the aforementioned stated objects of the invention, and generally constitutes a meritorious advance in the art unobvious to such a person not having the benefit of these teachings.

Obviously, many modifications and variations are possible in the light of the above teachings, and, it is therefore understood that the invention may be practiced otherwise than as specifically described.

What is claimed is:

1. A wideband fiber optic system for optically transmitting a video analog signal over a long distance, comprising:
   waveform generating means responsive to an input video analog signal having a given amplitude and a given frequency spectrum for producing a stream of narrow, separated electrical pulses of constant width wherein the pulse stream has a variable repetition frequency and the repetition frequency is varied according to the amplitude of said analog signal;
   wideband photoemitting transmitting means coupled to said waveform generating means for converting said electrical pulses into narrow optical pulses and transmitting said optical pulses;
   an optical fiber cable coupled to said transmitting means for conducting said optical pulses;
   wideband receiving means coupled to said optical fiber cable for receiving said optical pulses and converting said optical pulses into detected electrical pulses; and
   discriminating means coupled to said wideband receiving means and responsive to said detected electrical pulses for generating an output video analog signal having a given amplitude and a given frequency spectrum, the amplitude of said output analog signal varying according to the repetition frequency of said detected electrical pulses, whereby said output analog signal corresponds to said input analog signal.

2. A fiber optic system according to claim 1 wherein said waveform generating means comprises:
   means for generating a periodic wave of variable repetition frequency wherein the repetition frequency of said periodic wave is varied according to the amplitude of said analog signal; and
   pulse means coupled to said periodic waveform generating means for producing a relatively narrow electric pulse at a predetermined point in each cycle of said periodic wave.

3. A fiber optic system according to claim 2 wherein:
   said periodic waveform generating means comprises a voltage-controlled oscillator which produces a square wave; and
   said pulse means is adapted to be triggered at each positive-going edge of said square wave.

4. A fiber optic system according to claim 1 wherein said receiving means comprises:
   photodetecting means coupled to said optical conducting means and responsive to said optical pulses for generating electrical current pulses in response thereto; and
   means coupled to said photodetecting means for amplifying and converting said electrical current pulses into said detected electrical pulses.

5. A fiber optic system according to claim 1 wherein said discriminating means comprises:
   comparator means coupled to said receiving means for comparing the amplitude of each of said detected electrical pulses with a predetermined electrical level;
   pulse regenerating means coupled to said comparator means for producing an electrical pulse of predetermined characteristics whenever the amplitude of a detected pulse exceeds said predetermined electrical level; and
   filter means coupled to said pulse regenerating means and having a bandwidth equal to the bandwidth of said analog signals for rejecting high frequency components of said predetermined pulses and thereby producing said output analog signal.

6. A fiber optic system according to claim 5 wherein said waveform generating means comprises:
   means for generating a periodic wave of variable repetition frequency wherein the repetition frequency of said periodic wave is varied according to the amplitude of said analog signals; and
   pulse means coupled to said periodic waveform generating means for producing a single, relatively narrow electric pulse at the same point in each cycle of said periodic wave.

7. A fiber optic system according to claim 6 wherein:
   said periodic waveform generating means comprises a voltage-controlled oscillator which produces a square wave; and
   said pulse means is adapted to be triggered at each positive-going edge of said square wave.

8. A fiber optic system according to claim 7 wherein said transmitting means comprises:

photoemitting means coupled between said pulse means and said optical conducting means for generating relatively narrow pulses of optical flux in response to said electrical pulses.

9. A wideband fiber optic system for optically transmitting a video analog signal over a long distance comprising:
   waveform generating means responsive to an input video analog signal having a given amplitude and a given frequency spectrum for producing a stream of narrow separated electrical pulses of constant width wherein the pulse stream has a variable repetition frequency and the repetition frequency is varied according to the amplitude of said analog signal, the waveform generating means includes means for generating a periodic wave of variable repetition frequency wherein the repetition frequency of said periodic wave is varied according to the amplitude of said analog signals, the periodic waveform generating means being a voltage controlled oscillator that produces a square wave and pulse means coupled to said periodic waveform generating means for producing a single, relatively narrow electric pulse at the same point in each cycle of said periodic wave, the pulse means being adapted to be triggered at each positive-going edge of said square wave;
   wideband transmitting means coupled to said waveform generating means for converting said electrical pulses into optical pulses and transmitting said optical pulses, the transmitting means being an injection laser diode coupled to said pulse means for generating relatively narrow pulses of optical flux in response to said electrical pulses;
   a jacketed single optical fiber coupled to said transmitting means for conducting said optical pulses;
   wideband receiving means coupled to said jacketed single optical fiber for receiving said optical pulses and converting said optical pulses into detected electrical pulses, the receiving means includes an avalanche photodetector coupled to the jacketed single optical fiber and responsive to said optical pulses for generating electrical current pulses in response thereto, means coupled to the avalanche photodetector for amplifying and converting said electrical current pulses into said detected electrical pulses, gain-control amplification means coupled to said amplifying means for further amplifying said detected electrical pulses and for maintaining the amplitude of said detected electrical pulses at a predetermined level and peak detection means coupled between the output and an input of said gain-control amplification means; and
   discriminating means coupled to said receiving means and responsive to said detected electrical pulses for generating an output video analog signal having a given amplitude and a given frequency spectrum, the amplitude of said output analog signal varying according to the repetition frequency of said detected electrical pulses, whereby said output analog signal corresponds to said input analog signal, the discriminating means includes comparator means coupled to said receiving means for comparing the amplitude of each of said detected electrical pulses with a predetermined electrical level, pulse regenerating means coupled to said comparator means for producing an electrical pulse of predetermined characteristics whenever the amplitude of a detected pulse exceeds said predetermined electrical level, and filter means coupled to said pulse regenerating means and having a bandwidth equal to the bandwidth of said analog signals for rejecting high frequency components of said predetermined pulses and thereby producing said output analog signal.

10. A fiber optic system according to claim 9 wherein said comparator means is coupled to said gain-control amplification means and to an output of said peak detection means for comparing the amplitude of each of said detected electrical pulses with a predetermined level established by said peak detection means, wherein said level is determined in accordance with the relation given by:

$$KV_s + C\sigma$$

in which
   $0 < K < 1$
   C is a positive number
   $V_s$ = the peak level of said detected electrical pulses measured at the output of said gain-control amplification means
   $\sigma$ = RMS noise voltage measured at the output of said gain-control means.

11. A fiber optic system according to claim 9 further including:
   preemphasis means coupled between said periodic waveform generating means and a source of said input video analog signal for modifying the spectrum of said signals by providing relatively more gain for the high frequencies of said spectrum than for the low frequencies; and
   de-emphasis means coupled to the output of said discriminating means for modifying the spectrum of said output video analog signals by providing gain to said output analog signals which is the complement of the gain provided by said preemphasis means.

12. A fiber optic system according to claim 10 wherein said receiving means comprises:
   photodetecting means coupled to said optical conducting means and responsive to said optical pulses for generating electrical current pulses in response thereto; and
   means coupled to said photodetecting means for amplifying and converting said electrical current pulses into said detected electrical pulses.

13. A fiber optic system according to claim 12 wherein said photoemitting means comprises an injection laser diode.

14. A fiber optic system according to claim 13 wherein said optical fiber cable further comprises a jacketed single optical fiber.

15. A fiber optic system according to claim 14 wherein said photodetecting means comprises an avalanche photodetector.

* * * * *